United States Patent [19]

Kang

[11] Patent Number: 5,519,648
[45] Date of Patent: May 21, 1996

[54] INVERSE DISCRETE COSINE TRANSFORMER

[75] Inventor: Dong-Soo Kang, Seoul, Rep. of Korea

[73] Assignee: Daewoo Electronics Co., Ltd., Seoul, Rep. of Korea

[21] Appl. No.: 276,237

[22] Filed: Jul. 18, 1994

[30] Foreign Application Priority Data

Jul. 16, 1993 [KR] Rep. of Korea .................. 93-13512

[51] Int. Cl.⁶ .................................................. G06F 17/14
[52] U.S. Cl. .................................................. 364/725
[58] Field of Search .................................. 364/725, 726; 358/426, 432, 433

[56] References Cited

U.S. PATENT DOCUMENTS

| | | | |
|---|---|---|---|
| 5,202,847 | 4/1993 | Bolton et al. | 364/725 |
| 5,345,408 | 9/1994 | Hoogenboom | 364/725 |
| 5,349,549 | 9/1994 | Tsutsui | 364/725 |
| 5,387,982 | 2/1995 | Kitauva et al. | 364/725 |

OTHER PUBLICATIONS

Yanbin Yu et al., "Interlaced Video Coding with Field-based Multiresolution Representation", Signal Processing: Image Communication, vol. 5, pp. 185–198, Feb. 1993.

Arnould E. et al., "Real Time Discrete Cosine Transform—An Original Architecture", ICASSP 84. Proceedings of the IEEE International Conference on Acoustics, Speech and Signal Processing, vol. 3, pp. 46.6/1–4, Mar. 1984.

Primary Examiner—Roy N. Envall, Jr.
Assistant Examiner—Emmanuel L. Moise
Attorney, Agent, or Firm—Anderson Kill Olick & Oshinsky

[57] ABSTRACT

The present invention provides an IDCT apparatus for performing an IDCT operation on an input signal having a plurality of macroblocks of transformed coefficients and time gaps of variable duration, each of the time gaps being inserted between two successive macroblocks. The IDCT apparatus comprises an IDCT controller for generating a plurality of control signals, two IDCT processors for alternately converting the macroblocks of coefficients in the data signal into macroblocks of inverse transformed coefficients in response to the control signals. The outputs from the two IDCT processors are combined to the final inverse transformed output data signal from the IDCT apparatus.

2 Claims, 3 Drawing Sheets

INVERSE DISCRETE COSINE TRANSFORMER

FIELD OF THE INVENTION

The present invention relates to an inverse discrete cosine transform (IDCT) apparatus for use in a digital image processing system; and, more particularly, to an IDCT apparatus capable of processing a transformed video signal consisting of sets of video data and various time gaps intervening therebetween.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data.

The image signal can be normally compressed without seriously affecting its integrity because there usually exist certain correlationships or redundancies among some of the pixels in a single frame and also among those of neighboring frames. Accordingly, most of prior art image signal encoding methods employ various compression techniques (or coding methods) built on the idea of utilizing or truncating the redundancies.

One category of such coding methods relates to transform techniques which take advantage of the redundancies existing in a single frame. One of such transform methods is a two-dimensional Discrete Cosine Transform (DCT), which is described in Chen and Pratt, "Scene Adaptive Coder", *IEEE Transactions on Communication*, COM-32, No. 3 (March 1984).

In such schemes as ISO/IEC MPEG standards, the DCT is employed with other coding methods such as Differential Pulse-Code Modulation (DPCM) and motion compensated predictive coding which employs a motion estimation and prediction (see MPEG Video Simulation Model Three, International Organization for Standardization, Coded Representation of Picture and Audio Information, 1990, ISO-IEC/JTC1/SC2/WG8 MPEG 90/041).

In an image encoding/decoding system employing the DCT, a commercially available DCT/IDCT processor is often used in performing the DCT/IDCT operation. The present invention is primarily concerned with an apparatus which performs an IDCT operation in an image decoding system using commercially available IDCT processors.

In a conventional image encoding system, each frame of image signal is first divided into blocks, each of which comprising a predetermined number, e.g., 64, of pixel data, and is processed, e.g., discrete cosine transformed on a block-by-block basis. A macroblock is generated by putting a multiplicity of blocks together, and the image signal is subject to further processing, e.g., motion estimation and prediction on a macroblock basis. An additional signal containing, e.g., information about the encoding process, may be inserted between two successive macroblocks. Thereafter, the encoded image signal is subject to further processing such as channel coding for the transmission thereof.

In a conventional image decoding system, on the other hand, an image signal received through a transmission channel is subject to a series of decoding processes including, e.g., channel decoding, variable length decoding, runlength decoding and inverse quantization before an IDCT operation may be performed. In other words, an input signal to an IDCT apparatus is a transformed video signal provided from, e.g., an inverse quantizer included in the image decoding system and may comprise a data signal and an information signal. The data signal may contain a plurality of macroblocks of transformed coefficients and time gaps, each of the time gaps being inserted between two successive macroblocks, each of the macroblocks including a multiplicity of blocks and each of the blocks having a predetermined number of transformed coefficients which are fed to the IDCT apparatus at a constant rate. Each time gap corresponds to each additional signal inserted at the encoder and may be of a variable duration depending on the system. The information signal contained in the input signal may include various signals which are related to input timing of the data signal. Common examples of such signals are a macroblock flag which is activated, i.e., goes to an active high/low state during input cycles of the transformed coefficients contained in a macroblock and is deactivated during the time gap between two successive macroblocks, and a data block start signal which is activated during the first input cycle of each block.

As is well known, an IDCT processor performs an IDCT operation on an input signal on a block-by-block basis. The IDCT processor typically includes input leads for control signals which control a data flow inputted thereto and outputted therefrom, thereby enabling the block-by-block processing of the input signal. An output enable signal and a block start signal are examples of such control signals, although the names and functions of the control signals may vary with the type of the IDCT processor. The block start signal notifies the beginning of a block to the IDCT processor by, e.g., activating the corresponding input lead during the first input cycle of each block. The output enable signal controls the output tri-state, i.e., enabling the outputs of the processor or disabling them by driving to a high impedance state.

The IDCT processor may have some constraints on the format or timing of the input signal. Typically, the transformed coefficients should be applied to the IDCT processor sequentially at a constant rate of one coefficient per one clock cycle and the time gap between two successive macroblocks should satisfy certain conditions. For example, the time gap should be multiples of the number of coefficients in a block of clock cycles or should be greater than a latency. The latency refers to a time interval between the start of a block input and the start of the block output and is defined by the characteristics of the IDCT processor. The IDCT processor outputs inverse transformed coefficients in a similar manner to the input after the latency.

If the input signal does not satisfy the condition imposed by the IDCT processor, internal synchronization of the IDCT processor becomes violated and the IDCT processor cannot provide a proper result.

Accordingly, due to the constraints on the timing of an input signal, the IDCT processor of the art may become unable to deal with the time gaps of variable duration inserted between the macroblocks on its own.

SUMMARY OF THE INVENTION

It is a primary object of the present invention to provide an IDCT apparatus for performing an IDCT operation on an input signal having a plurality of macroblocks of transformed coefficients and time gaps of variable duration, each of the time gaps being inserted between two successive macroblocks.

In accordance with the present invention, there is provided IDCT apparatus for performing an IDCT operation on an input signal having a data signal and an information signal to generate an inverse transformed data signal, wherein said data signal includes a plurality of macroblocks of transformed coefficients and time gaps of variable duration, each of said macroblocks comprising a multiplicity of blocks, each of said blocks having a predetermined number of transformed coefficients and each of said time gaps being inserted between two successive macroblocks and said inverse transformed data signal includes a plurality of macroblocks of inverse transformed coefficients, comprising:

an IDCT controller for alternately generating a multiple number of first sets of control signals and a multiple number of second sets of control signals in response to said information signal, wherein said multiple number of first sets of control signals corresponds to the odd-numbered macroblocks in the data signal and said multiple number of second sets of control signals corresponds to the even-numbered macroblocks in data signal;

first IDCT means for converting the odd-numbered macroblocks in the data signal into odd-numbered inverse transformed macroblocks in response to said multiple number of first sets of control signals;

second IDCT means for converting the even-numbered macroblocks in the data signal into even-numbered inverse transformed macroblocks in response to said multiple number of second sets of control signals; and means for combining the odd-numbered and the even-numbered inverse transformed macroblocks in response to the first and second sets of control signals, thereby generating the inverse transformed data signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
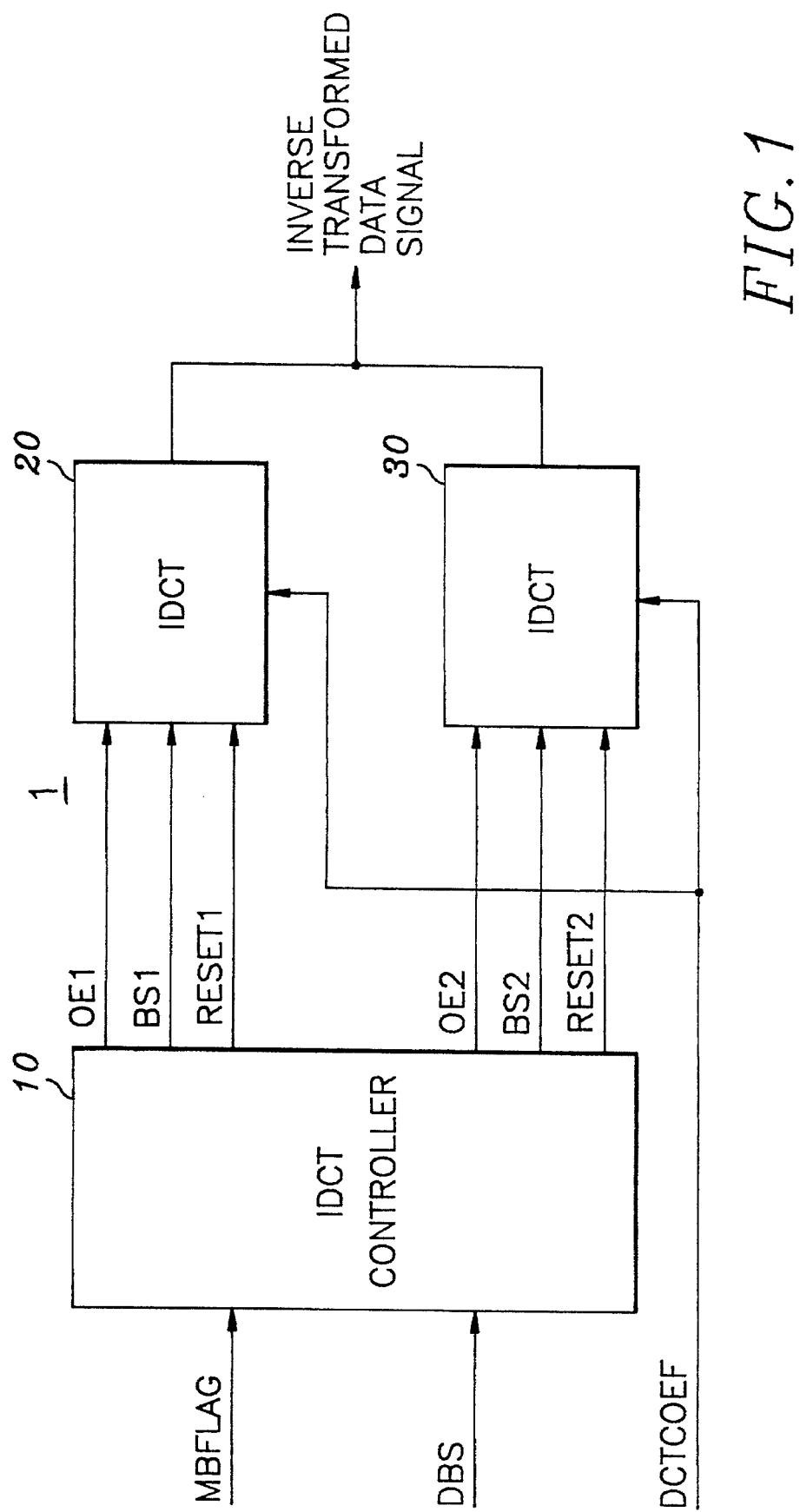
FIG. 1 shows a block diagram of the IDCT apparatus of the present invention.
Figure 3:
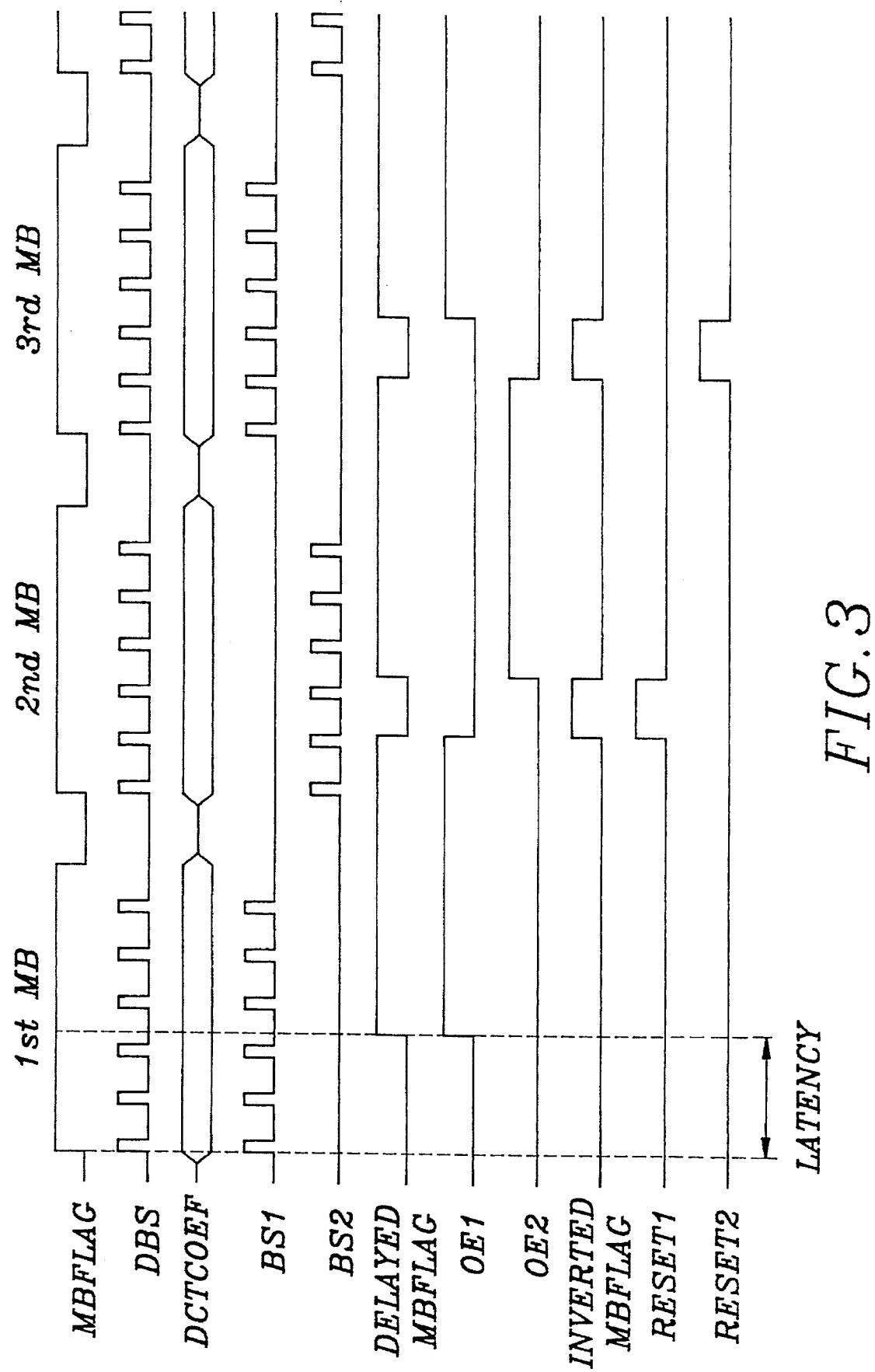
FIG. 3 represents exemplary waveforms of various signals inputted to and generated from the IDCT controller in accordance with the present invention.

There are shown in FIGS. 1 and 3, an IDCT apparatus of the present invention, and waveforms for various input and output signals thereof, respectively.

An input signal to the IDCT apparatus 1 of the present invention is of a standard type transformed video signal which may be provided from another part of an image decoding system such as the inverse quantizer (not shown); and comprises a data signal DCTCOEF and information signals MBFLAG and DBS.

DCTCOEF shown in FIGS. 1 and 3 is inputted to IDCTs 20 and 30 to be inverse transformed therein. DCTCOEF comprises a plurality of macroblocks of transformed coefficients and time gaps, each of the time gaps being inserted between two successive macroblocks. Each of the macroblocks comprises a multiplicity of blocks, each of which containing a predetermined number of DCT coefficients.

MBFLAG and DBS are input information signals to an IDCT controller 10. MBFLAG includes a plurality of macroblock flags each of which representing the duration of each of the macroblocks and is activated, i.e., goes to an active high state while the transform coefficients in a macroblock are being inputted; and is deactivated during the time gap between two neighboring macroblocks as depicted in FIG. 3. DBS includes a plurality of groups of data block start signals each group corresponding to each macroblock and each data block start signal in a group representing the start of each block in a corresponding macroblock. Specifically, DBS is activated during the first input cycles of each block as shown in FIG. 3.

The IDCT controller 10 provides various control signals to the IDCTs 20 and 30 in response to MBFLAG and DBS as described hereinafter in conjunction with FIG. 2. The IDCT controller 10 provides OE1, BS1 and RESET1 to the IDCT 20; and OE2, BS2 and RESET2 to the IDCT 30.

BS1 and BS2 include the block start signals inputted to the IDCTs 20 and 30, respectively. BS1 includes a multiple number of groups of block start signals, each group corresponding to each odd-numbered macroblock and each block start signal in a group representing the start of each block in a corresponding odd-numbered macroblock. Specifically, BS1 is activated during the first input cycle of each block contained in odd-numbered, e.g., 1st and 3rd, macroblocks; and BS2 is activated in even-numbered, e.g., 2nd and 4th, macroblocks as shown in FIG. 3.

OE1 and OE2 include the output enable signals inputted to the IDCTs 20 and 30, respectively. OE1/OE2 includes a multiple number of output enable signals each of which controlling the output tri-state of the IDCT 20/30. OE1 and OE2 are activated alternately as shown in FIG. 3, thereby alternately enabling the corresponding output leads of the IDCTs 20 and 30. When OE1 and/or OE2 are deactivated, the output leads of the IDCTs 20 and/or 30 are disabled, i.e., driven to a high impedance state.

Reset signals included in RESET1 and RESET2 initialize the IDCTs 20 and 30, respectively. RESET1/RESET2 includes a multiple number of reset signals each of which is activated after OE1/OE2 goes to a low state and is deactivated before a new macroblock begins. RESET1 and RESET2 are activated alternately as shown in FIG. 3, thereby alternately initializing the IDCTs 20 and 30.

In response to the control signals, the IDCTs 20 and 30 perform the IDCT operation on the transformed coefficients inputted thereto. The IDCTs 20 and 30 may be identical, commercially available IDCT processors having a latency of a predetermined duration. The IDCTs 20 and 30 perform the IDCT operation on the odd-numbered and the even-numbered macroblocks of transformed coefficients, in response to BS1, OE1, RESET1 and BS2, OE2, RESET2, respectively. Specifically, the IDCT 20 performs the IDCT operation on each block of the transformed coefficients contained in the 1st macroblock in response to each block start signal in the first group of BS1 as shown in FIG. 3. After the latency, the inverse transformed coefficients are outputted in response to OE1. After all the inverse transformed coefficients for the 1st macroblock are outputted, OE1 is deactivated and RESET1 is activated, thereby initializing the IDCT 20 for the processing of a 3rd macroblock. The IDCT 30 performs substantially the same operation as the IDCT 20. As stated previously, with the same signal DCTCOEF as the input data signal, the IDCTs 20 and 30 process and provide the results for the alternate macroblocks.

Corresponding output leads of the IDCTs 20 and 30 for inverse transformed data are hard-wired, i.e., put together directly. Therefore, odd-numbered inverse transformed macroblocks, i.e., odd-numbered macroblocks of inverse transformed coefficients outputted from the IDCT 20 and even-numbered inverse transformed macroblocks, i.e., even-numbered macroblocks of inverse transformed coefficients outputted from the IDCT 30 are combined on the hard-wired line, thereby generating an inverse transformed data signal.

Figure 2:
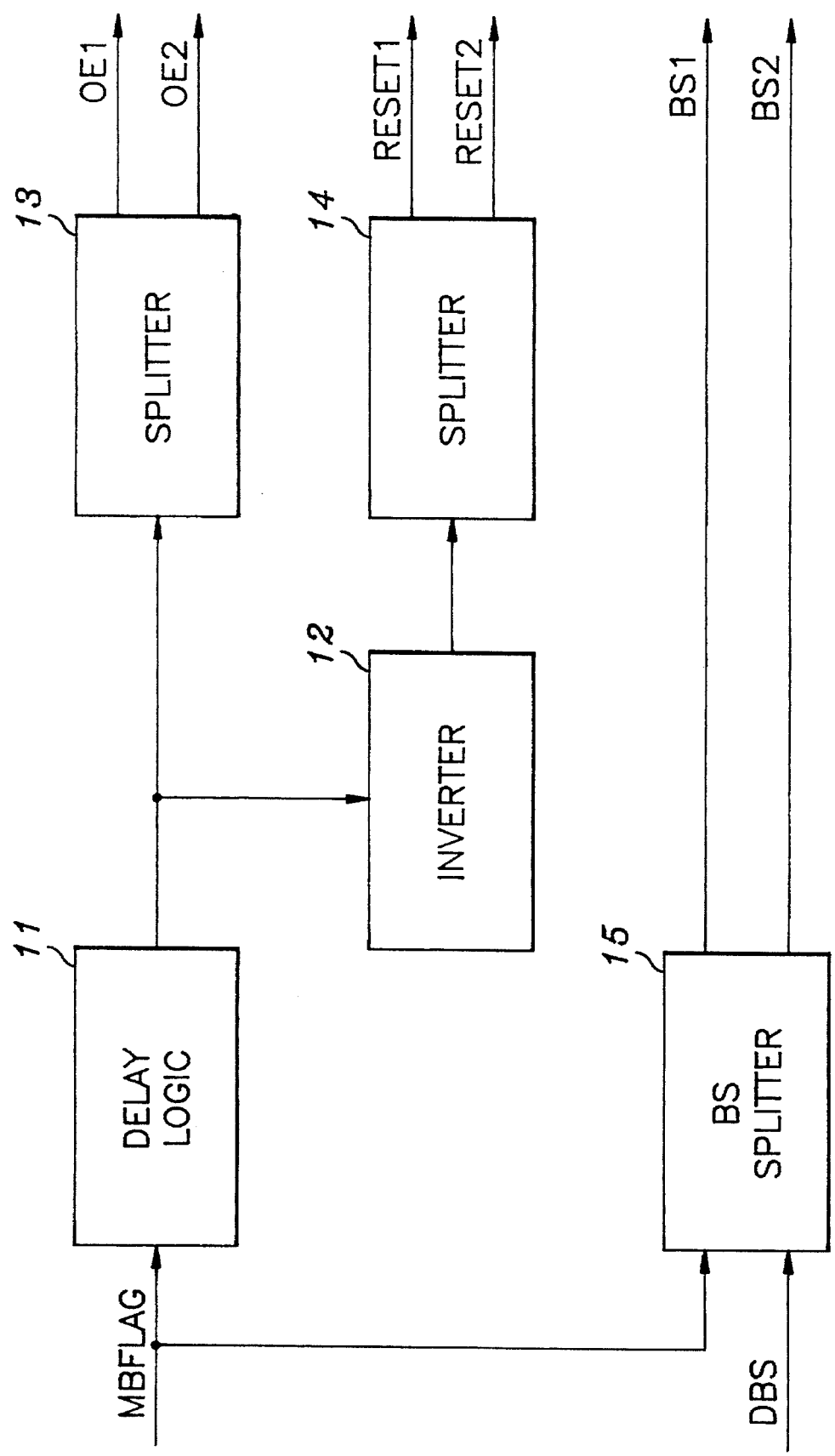
FIG. 2 illustrates a block diagram of the IDCT controller shown in FIG. 1.

FIGS. 2 and 3 depict a block diagram of the IDCT controller 10 shown in FIG. 1 and waveforms of various signals inputted to each part of the IDCT controller 10 and outputted therefrom, respectively.

A delay logic 11 delays the MBFLAG by the latency of the IDCT processor, providing a delayed MBFALG shown in FIG. 3 to an inverter 12 and to a splitter 13.

The splitter 13 splits the delayed MBFLAG, providing OE1 and OE2 shown in FIG. 3 to the IDCTs 20 and 30, respectively.

The inverter 12 converts the delayed MBFLAG, providing an inverted MBFLAG shown in FIG. 3 to a splitter 14.

The splitter 14 splits the inverted MBFLAG, providing RESET1 and RESET2 shown in FIG. 3 to the IDCTs 20 and 30, respectively.

A BS splitter 15 receives MBFLAG and DBS, and provides BS1 and BS2 to the IDCTs 20 and 30, respectively, by splitting DBS as shown in FIG. 3. The delay logic 11, the splitters 13, 14 and the BS splitter 15 can be implemented easily using commercial transistor-transistor-logic (TTL) devices.

As described above, the IDCT apparatus of the present invention deals with the time gaps of variable duration inserted between neighboring macroblocks on its own by employing two IDCT processors alternately on a macroblock basis.

Although the present invention has been described particularly in connection with a image decoding system, it will be apparent to those skilled in the art that the IDCT apparatus of the present invention can be adapted for use in other image processing systems in which IDCT operation may be performed on an input signal having a similar format to the present invention.

Actually most IDCT processors available in the art also perform a DCT operation and have similar constraints on the format of input signal. Therefore, the present invention can also be directly applied to a DCT apparatus for use, e.g., in an image encoding system, which performs a DCT operation on a video signal on a block-by-block basis and performs, e.g., a motion estimation and prediction on a macroblock basis.

While the present invention has been described with respect to the particular embodiments, it will be apparent to those skilled in the art that various changes and modifications may be made without departing from the spirit and scope of the invention as defined in the following claims.

What is claimed is:

1. An inverse discrete cosine transformation (IDCT) apparatus for performing an IDCT operation on an input signal having a data signal and an information signal to generate an inverse transformed data signal, wherein the data signal includes a plurality of macroblocks of transformed coefficients and time gaps of variable durations, each of the macroblocks including a multiplicity of blocks, each of said blocks having a predetermined number of transformed coefficients and each of said time gaps being inserted between two successive macroblocks and said inverse transformed data signal includes a plurality of macroblocks of inverse transformed coefficients; and the information signal includes a plurality of first indicator signals, each of the first indicator signals representing the duration of each of the macroblocks, and a plurality of groups of second indicator signals, each group of the second indicator signals corresponding to each of the macroblocks, each of the second indicator signals representing the start of each of the blocks, the IDCT apparatus comprising:

an IDCT controller for alternately generating a multiple number of first sets of control signals and a multiple number of second sets of control signals in response to the information signal, wherein the multiple number of first sets of control signals corresponds to the odd-numbered macroblocks in the data signal, the multiple number of second sets of control signals corresponds to the even-numbered macroblocks in the data signal, each of the first sets of control signals includes a first group of block start signals, each of the block start signals in the first group indicating the start of each block in the odd-numbered macroblocks and a first output enable signal for enabling an output from the first IDCT means and each of the second sets of control signals includes a second group of block start signals, each of the block start signals in the second group indicating the start of each block in the even-numbered macroblocks and a second output enable signal for enabling an output from the second IDCT means, including:

a delay logic for delaying the first indicator signals by a predetermined time interval, generating delayed first indicator signals;

a first splitter for splitting the delayed first indicator signals into the first and the second output enable signals; and a second splitter for splitting the groups of second indicator signals into the first and the second groups of block start signals;

first IDCT means for converting the odd-numbered macroblocks in the data signal into odd-numbered inverse transformed macroblocks in response to the multiple number of first sets of control signals;

second IDCT means for converting the even-numbered macroblocks in the data signal into even-numbered inverse transformed macroblocks in response to the multiple number of second sets of control signals; and means for combining the odd-numbered and the even-numbered inverse transformed macroblocks in response to the first and the second sets of control signals, thereby generating the inverse transformed data signal.

2. An inverse discrete cosine transformation (IDCT) apparatus for performing an IDCT operation on an input signal having a data signal and an information signal to generate an inverse transformed data signal, wherein said data signal includes a plurality of macroblocks of transformed coefficients and time gaps of variable durations, each of the macroblocks including a multiplicity of blocks, each of the blocks having a predetermined number of transformed coefficients and each of the time gaps being inserted between two successive macroblocks and the inverse transformed data signal includes a plurality of macroblocks of inverse transformed coefficients; and the information signal includes a plurality of first indicator signals, each of the first indicator signals representing the duration of each of the macroblocks, and a plurality of groups of second indicator signals, each group of the second indicator signals corresponding to each macroblock, each of the second indicator signals representing the start of each block, the IDCT apparatus comprising:

an IDCT controller for alternately generating a multiple number of first sets of control signals and a multiple number of second sets of control signals in response to the information signal, wherein the multiple number of first sets of control signals corresponds to the odd-numbered macroblocks in the data signal, the multiple number of second sets of control signals corresponds to the even-numbered macroblocks in the data signal, each of the first sets of control signals includes a first group of block start signals, each of the block start signals in the first group indicating the start of each block in the odd-numbered macroblocks, a first reset signal for initializing the first IDCT means and a first output enable signal for enabling an output from the first IDCT means and each of the second sets of control signals includes a second group of block start signals, each of the block start signals in the second group indicating the start of each block in the even-numbered macroblocks, a second reset signal for initializing the second IDCT means and a second output enable signal for enabling an output from the second IDCT means, including:

a delay logic for delaying the first indicator signals by a predetermined time interval, generating delayed first indicator signals;

a first splitter for splitting the delayed first indicator signals into the first and the second output enable signals;

a second splitter for splitting the groups of second indicator signals into the first and the second groups of block start signals;

an inverter for converting the delayed first indicator signals to inverted first indicator signals; and a third splitter for splitting the inverted first indicator signals into the first and the second reset signals;

first IDCT means for converting the odd-numbered macroblocks in the data signal into odd-numbered inverse transformed macroblocks in response to the multiple number of first sets of control signals;

second IDCT means for converting the even-numbered macroblocks in the data signal into even-numbered inverse transformed macroblocks in response to the multiple number of second sets of control signals; and means for combining the odd-numbered and the even-numbered inverse transformed macroblocks in response to the first and the second sets of control signals, thereby generating the inverse transformed data signal.

\* \* \* \* \*